April 1, 1952     I. R. VERSOY     2,591,030
SOLENOID-OPERATED VALVE STRUCTURE
Filed Oct. 9, 1945     2 SHEETS—SHEET 1

Inventor
Irving R. Versoy
By Rockwell Brackstow
Attorneys

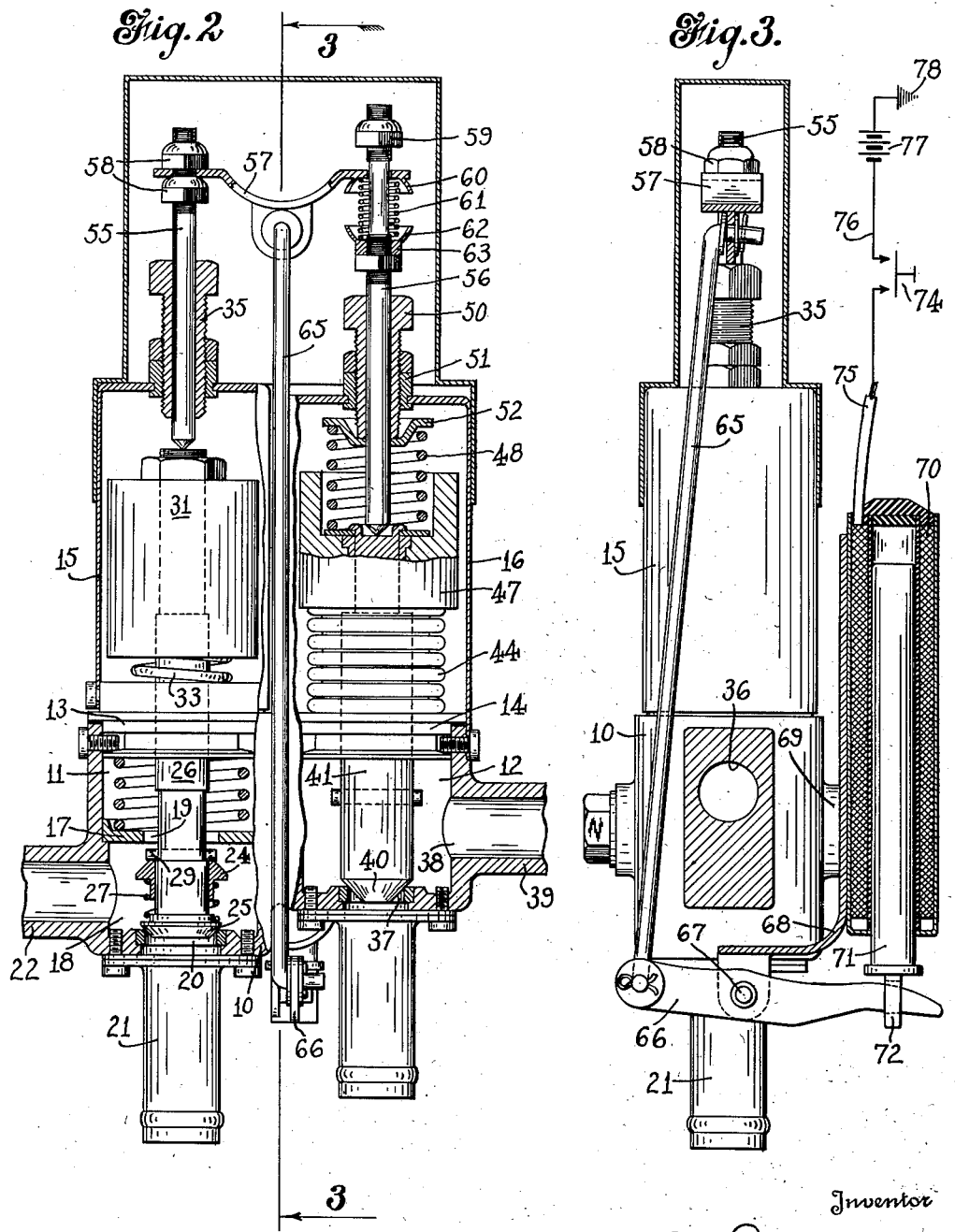

Patented Apr. 1, 1952

2,591,030

UNITED STATES PATENT OFFICE 2,591,030

SOLENOID-OPERATED VALVE STRUCTURE

Irving R. Versoy, New Haven, Conn., assignor to The Berger Brothers Company, New Haven, Conn., a corporation of Connecticut Application October 9, 1945, Serial No. 621,311

5 Claims. (Cl. 137—139)

This invention relates to a fluid pressure control mechanism arranged to control the delivery of fluid such as air, for example, to a given receptacle in such a manner that the fluid may be delivered to the receptacle under certain conditions, and that regulation of the pressure of the delivered fluid will also be effected. It particularly relates to an automatically operated control mechanism of this character which shall be provided with additional manually controlled or manually operated means to operate the valves so that, while the mechanism will remain under the control of the automatically operated device, at the same time the user may at will operate the mechanism independently of the automatic regulation.

As shown, the invention is applied to a valve structure similar to that disclosed in the prior application of myself and Anthony D. Rapuano, Serial No. 573,932, filed January 22, 1945. The mechanism of that application is a valve structure particularly adapted to controlling and regulating the admission of air under pressure to suits worn by aviators to prevent the injurious effects resulting from sudden changes in speed and direction of an airplane, and is so arranged that operation of the controlling valves of the mechanism is effected by the action of centrifugal force so that, when a change in the direction of the plane occurs, the suit worn by the aviator will be automatically placed under pressure, and this pressure regulated or varied according to the value or degree of the centrifugal force to which the aviator is subjected.

It has been found that it is desirable to provide such an automatic controlling device with manually operable means readily accessible to the pilot of the plane, whereby the latter may inflate his suit or parts thereof at will regardless of whether or not he is subjected to the action of centrifugal force. In the present invention, therefore, it is contemplated to provide means which may, for example, be electrically operated and under control of the pilot of the plane for introducing pressure into the pilot's suit at will without interfering with the automatic operation of the mechanism for effecting this result under the action of centrifugal force. In addition, the manually operated means is so connected to the controlling valve structure that, while the suit may be inflated at the will of the user, the degree of inflation will be limited so that the pressure obtaining in the suit will not reach an excessively high figure.

One object of the present invention is to provide a valve structure having automatic means for controlling the delivery of air to a given receptacle with additional manually operated means for this purpose.

A still further object of the invention is to provide a valve structure for controlling the delivery of air under pressure to a receptacle with both automatic and manually controlled means of operation, the parts being so arranged that the manually operated means may be employed independently of the automatically operated devices and without interfering with the action of the latter when the manual means is released.

A still further object of the invention is to provide a device of the character described in which the manually operated means for the valve structure will be electrically operated.

A still further object of the invention is to provide a valve structure of the character described and actuating means therefor comprising manually operated mechanism for actuating the valves of the structure to admit air under pressure to a given receptacle and which will, at the same time, limit the pressure of the air delivered to the receptacle.

To these and other ends the invention consists in the novel features and combinations of parts to be hereinafter described and claimed.

In the accompanying drawings:

Fig. 2 is a front elevational view of the valve mechanism the casing being shown in section to expose the interior parts, and the valves being shown in another position; and Fig. 3 is a sectional view on line 3—3 of Fig. 2.

Figure 1:
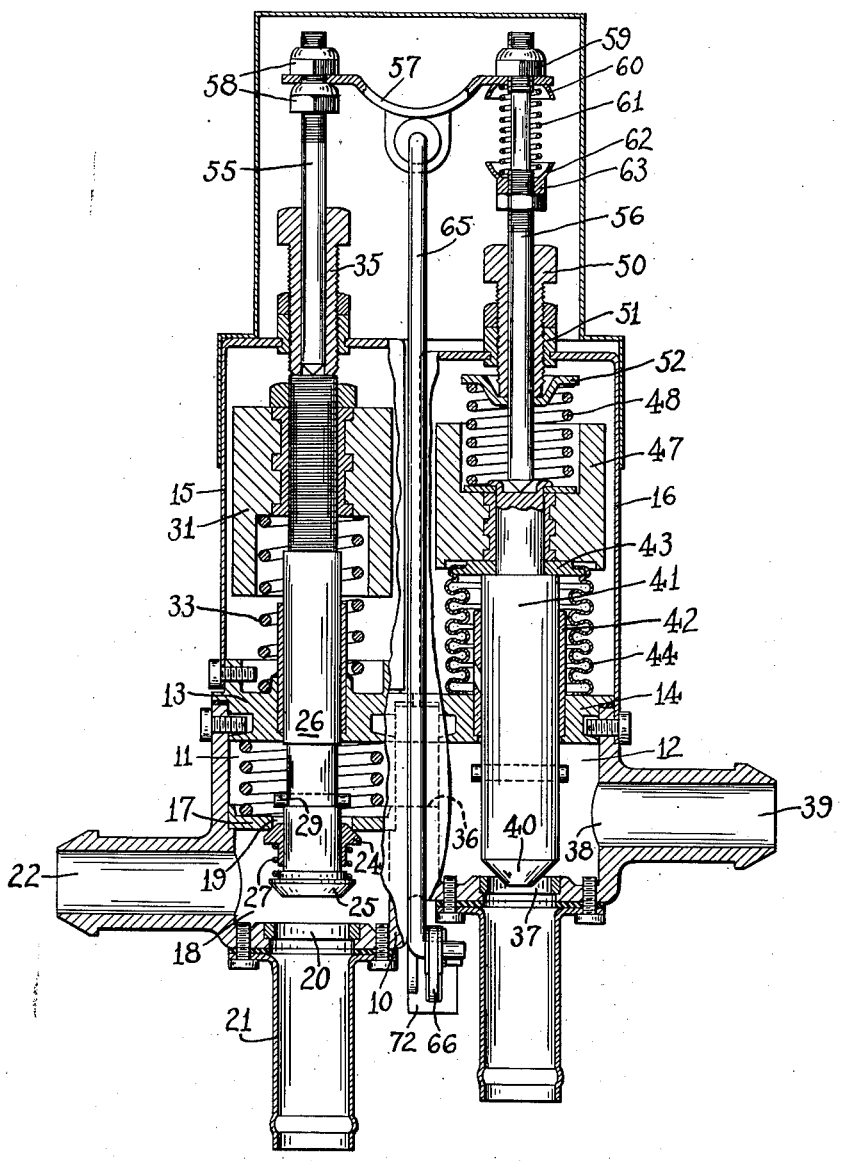
Fig. 1 is a sectional view of a valve structure embodying my invention.

To illustrate one embodiment of my invention, I have shown in Fig. 1 of the drawings a valve casing designated generally by the numeral 10, the casing being provided with chambers 11 and 12. Above these chambers are partitions 13 and 14 upon which are supported sealing caps 15 and 16.

The chamber 11 is separated by a partition 17 from a lower chamber 18, the partition 17 having provided therein a port 19 providing communication between the chambers 11 and 18. A second port 20 is provided at the lower portion of the chamber 18, this port as shown being in alignment with the port 19, and from the port 20 leads a pipe or duct 21 which may lead to any place where it is desired to convey fluid pressure such as a gas tank, for example, or it may lead directly to the atmosphere if it is merely desired to vent the chamber 18. In the form of the invention shown, however, it will be assumed that the duct 21 leads to the gas tank of an airplane to pressurize or put under pressure the gas in the tank.

Inlet means in the form of a pipe 22 is provided for the chamber 18, it being understood that fluid such as air, for example, will be admitted to the chamber through such inlet. The ports 19 and 20 are controlled respectively by valves 24 and 25, the valve 25 being secured to the lower end of a valve stem 26 slidably mounted in the partition 13 while the valve 24 is slidably mounted upon this stem and is urged toward the port 19 or away from the valve 25 by a spring 27 acting between the two valves. It will be seen, therefore, that the spring 27 normally tends to hold the valve 24 against the seat in the partition 17 closing the port 19.

An abutment in the form of a pin 29 is secured in the valve stem 26 above the valve 24, which abutment is adapted to pass through the port 19 and engage the valve 24 when the stem is moved downwardly from the position shown in Fig. 1 and move this valve from its seat to open the port 19 as shown in Fig. 2.

The valve stem also extends upwardly through the partition 13 into the cap 15, and at its upper end a weight 31 is secured thereto. Between the weight 31 and the partition 13 is a compression spring 33 normally urging the valve stem upwardly so as to maintain the valve 25 away from its seat in the lower part of the chamber 18 and, therefore, normally maintain the port 20 in open position. A hollow stop screw 35 is adjustably mounted at the upper end of the cap to serve as an abutment or stop for the upper end of the valve stem.

The chamber 11 is provided with a port 36 which in the form of the invention now being described provides communication with the chamber 12, and it will be apparent that the valve mechanism heretofore described is designed to permit air or other fluid under pressure which enters the chambers 18 through the inlet 22 to pass downwardly through the outlet pipe 21 when the parts are in the position shown in Fig. 1 or to pass upwardly through the port 19 and through the port 36 into the chamber 12 when the parts are in the position shown in Fig. 2. Thus the position of the valves 24 and 25 determines whether the pressure fluid entering the chamber 18 is delivered to the gas tank, for example, through the pipe 21 or diverted into the chamber 12 for use in another relation.

It will also be noted that the spring 33 is normally of sufficient strength to overcome the downward force exerted by the weight 31 under normal conditions, that is, under the normal value due to gravity but, that when the mechanism is subjected to centrifugal force acting in a downward direction as the mechanism is shown in Fig. 1, the additional pull of this centrifugal force on the weight 31 will overcome the force of the spring 33 and move the valve stem 26 downwardly to seat the valve 25 on the port 20 and thus close this outlet port. When this occurs, the pin 29 will engage the valve 24 moving this valve from its seat and thus opening port 19 to permit fluid pressure in the chamber 18 to pass into the chamber 12 through the port 36. Thus the fluid under pressure may be diverted from the outlet pipe 21 to the chamber 12 when the centrifugal force to which the mechanism is subjected reaches a given value, and this value may be adjusted or predetermined by adjustment of the spring 33.

The chamber 12 is provided with a vent port 37 and an outlet port 38 from which leads a duct or pipe 39 at a point of delivery which, if the device is used in connection with an aviator's suit, will be a bladder or bladders to be inflated within the suit. This outlet pipe 39 may, of course, lead to any desired point of delivery where the fluid under pressure is to be used.

The vent port 37 is controlled by a valve 40 at the lower end of a stem 41 which passes upwardly through a sleeve 42 secured in the partition 14 and has secured adjacent its upper end a plate 43 constituting the upper wall of a collapsible bellows 44, the lower end of which is secured to the partition 14.

It will be understood that the stem 41 fits relatively loosely within the sleeve 42 so that air, for example, in the chamber 12 may pass upwardly about the stem into the bellows 44. The plate 43 being connected to the stem, it will be apparent that the pressure of the air in the chamber 12 will upon entering the bellows tend to raise the valve 40 from its seat about the port 37. With the above construction it will be apparent that the position of the valve 40 will depend upon whether or not the pressure obtaining in the chamber 12 and to which the bellows 44 is subjected will be sufficient to overcome the weight which may be applied to the bellows and the tendency of the bellows to resist expansion. For example, when the air pressure in chamber 12 reaches such a value that this pressure applied over the effective area of the bellows 44 overcomes the resistance of the bellows to expansion and any weight or force which may be applied to the bellows, the valve 40 will be opened and the chamber 12 vented to the atmosphere. Thus the pressure in chamber 12 will be maintained below a certain maximum depending upon the downward force exerted upon the bellows as, when the upward force exerted upon the stem 41 by the bellows overcomes this downward force, the valve 40 will be opened. This upward force is, of course, the product of the pressure obtaining in the chamber 12 and the effective area of the bellows 44.

Upon the upper end of stem 41 is provided a weight 47 so that this weight is carried by the valve stem. It will be understood that under conditions of rest, the weight 47 is subject to the force of gravity and, therefore, only a force due to the effect of gravity on this weight will be exerted downwardly on the stem 41 in a direction to seat the valve 40. However, if the mechanism is subjected to the action of centrifugal force acting in a direction to move the weight toward the chamber 12, the force exerted by the weight will be increased and that variation in this force will be proportional to the increase or decrease in the value of centrifugal force acting upon the weight. Thus, depending on the value of centrifugal force to which the weight is subjected, the amount of pressure in chamber 12 necessary to raise the valve 40 from its seat and vent this chamber to the atmosphere will be varied. Therefore, the air in the chamber 12 will be maintained at a predetermined pressure depending upon the value of centrifugal force to which the weight is subjected and this pressure will also obtain in the aviator's suit or other receptacle connected to the delivery pipe 39.

Also acting upon the weight 47 is a compression spring 48, the tension of which may be adjusted by a hollow adjusting screw 50 threaded into a nut 51 secured in the top of the cap or casing 16, this screw acting upon a cap 52 seated upon the spring 48. This spring normally acts downwardly on the bellows and valve in addition to the weight 47, and the spring may be adjusted by adjusting screw 50 so as to adjust the pressure of the air initially admitted to the aviator's suit when the centrifugal force to which the mechanism is subjected reaches a given value.

It is believed that the operation of the mechanism thus far described will be obvious to those skilled in the art without further explanation.

It will be apparent that the above mechanism will be automatically controlled under the action of centrifugal force so that, when the aviator is subjected to the action of centrifugal force of a given value, air under pressure will be admitted to his suit, and that under regulation of valve 40 the degree of pressure obtaining in the suit will be varied according to the value of this centrifugal force. It often occurs, however, that it is desired to inflate the suit manually whether or not the aviator is subjected to conditions necessary to bring about automatic operation of the mechanism, and I have provided means operable at the will of the user of the device for this purpose.

A push rod 55 is slidably mounted in the hollow adjusting nut 35, this rod bearing upon the upper end of the valve stem 26 when it is moved downwardly so as to move the valves 24 and 25 from the position shown in Fig. 1 to those shown in Fig. 2. Similarly a push rod 56 is slidably mounted in the adjusting screw 50, the lower end of which rod bears against the upper end of the valve stem 41 so as to move the valve 40 downwardly upon its seat when the rod is actuated. A bridge member 57 is secured to one end of rod 55 between adjustable nuts 58 adjustably threaded on the rod 55, while the other end of this member is loosely or slidably mounted on the rod 56 below the nut 59 threaded upon this rod.

To the latter end of the bridge member 57 is secured a cup 60 bearing upon a compression spring 61 embracing the push rod 56 between the cup 60 and a companion cup 62, adjustably secured to the rod 56 by the nut 63. It will be apparent that with the above construction, when the bridge member 57 is moved downwardly as shown in Fig. 1, the rod 55 will also be moved positively downward to seat the valve 25 through engagement of the rod 55 with the valve stem 26 and that the spring 61 will be compressed upon the rod 56 to move the latter rod downwardly to close the valve 40 under pressure of this spring. However, when air pressure in the chamber 12 reaches a sufficient value to cause the bellows 44 to overcome the force of the spring 61, the valve 40 will be permitted by the latter spring to move upwardly and thus open the port 37. Therefore, when the valve 40 is closed by the downward movement of the bridge member 57, it acts as a pressure relief valve under the force of spring 61 to limit the pressure in the chamber 12 according to the adjustment of the spring 61 by the adjustable nut 63.

Pivoted at its upper end to the bridge member 57 is a link 65, the lower end of which is pivoted to a lever 66, this lever being pivoted between its ends as at 67 to a bracket 68 secured to bosses 69 on the valve casing 10. Supported by the bracket 68 is a solenoid 70 provided with a movable plunger 71, the lower end of this plunger carrying an eye member 72 in which is received the end of the lever 66. It will be apparent that when the solenoid 70 is energized, the plunger 71 will be moved upwardly, thus drawing the link 65 downwardly to depress the bridge member 57.

The solenoid may be energized by means of a push button 74 to which a wire 75 leads from the solenoid and from which leads a wire 76 to a source of current 77 and thence to ground 78. This push button may be conveniently located so as to be readily accessible to the aviator or user of the device whereby he may at will, by pressing the push button, effect the seating of valves 25 and 40 so as to deliver pressure entering the chamber 18 through inlet 22 to the suit or other receptacle through outlet 39.

While the valve 25 will be held positively against its seat, the valve 40 will be held against its seat by the spring 61 so that, when the air pressure in chamber 12 to which the interior of the bellows 44 is subjected becomes sufficient to overcome the downward pressure of springs 48 and 61, the valve 40 will be raised from its seat and permit the venting of the chamber 12. Thus an excessive degree of inflation of the suit will be prevented, notwithstanding the degree of pressure which enters the valve structure through the inlet 22.

As soon as the operator releases the push button 74 and thus de-energizes the solenoid, the plunger 71 will be permitted to drop and thus allow the valve stems 26 and 41 to be restored to their original positions by the spring 33 and bellows 44 respectively.

While I have shown and described a preferred embodiment of my invention, it will be understood that it is not to be limited to all of the details shown, but is capable of modification and variation within the spirit of the invention and within the scope of the claims.

What I claim is:

1. In a valve device, a casing having a port and a valve to control said port, means normally urging said valve to a predetermined open position with respect to the port, a weighted member supported by the valve whereby it may be closed under the action of centrifugal force, and additional means to close said valve at will, said means being electrically controlled.

2. In a valve device, a casing having a port and a valve to control said port, means normally urging said valve to a predetermined position with respect to the port, said valve having a stem, a rod slidably mounted with respect to the casing and engaging said stem, electrically operated means for moving said rod to move the valve to close the port, said means including a compression spring surrounding the rod to urge said rod toward the stem whereby the valve is held in closed position under tension of the spring.

3. In a valve construction, a casing having a pair of chambers, each of which has a port, a valve in each of the chambers to control the port thereof, means to move each of said valves to closed position comprising a rod bearing against each valve and slidably mounted with respect to the case, a bridge member spanning said rods and supported thereby, an abutment on each of the rods against which said bridge member acts, electrically operated means for moving said bridge member, and a compression spring mounted between the bridge member and the abutment on one of the rods, whereby the corresponding valve is held closed under spring pressure.

4. A valve construction as in claim 3 wherein a weighted member is supported by each of the valves whereby the latter may be actuated by centrifugal force.

5. In a valve construction, a casing having a pair of chambers, each of which has a port, a valve in each of the chambers to control the port thereof, means to move said valves to closed position comprising a plunger, means to actuate said plunger, means connecting said plunger to each of the valves to move the same, and the connecting means to one of said valves including a spring placed under tension by said plunger to hold said valve in closed position under spring pressure.

IRVING R. VERSOY.

REFERENCES CITED

The following references are of record in the file of this patent:

UNITED STATES PATENTS

| Number | Name | Date |
|---|---|---|
| 1,170,727 | Baker | Feb. 8, 1916 |
| 1,197,721 | Drago | Sept. 12, 1916 |
| 1,389,056 | Lane | Aug. 30, 1921 |
| 1,547,830 | Shortt | July 28, 1925 |
| 1,898,083 | Doble | Feb. 21, 1933 |
| 1,954,903 | Walker | Apr. 17, 1934 |
| 1,990,290 | Larkin | Feb. 5, 1935 |
| 2,159,785 | Down | May 23, 1939 |
| 2,203,771 | Blankenbuehler | June 11, 1940 |
| 2,325,878 | Ray | Aug. 3, 1943 |
| 2,368,822 | Gardner | Feb. 6, 1945 |
| 2,377,256 | Mallory | May 29, 1945 |
| 2,398,452 | Shaw | Apr. 16, 1946 |
| 2,427,788 | Kehle | Sept. 23, 1947 |